(12) United States Patent
Sells et al.

(10) Patent No.: US 10,559,017 B2
(45) Date of Patent: *Feb. 11, 2020

(54) AUTO REPAIR QUOTE PLATFORM

(71) Applicant: Top Brands Tire & Wheel, Cape Coral, FL (US)

(72) Inventors: Boake Sells, Naples, FL (US); William Seltzer, Vashon, WA (US); Richard Goodwin, Cape Coral, FL (US); John Szabo, Cape Coral, FL (US); Douglas Masters, Cape Coral, FL (US)

(73) Assignee: Top Brands Tire & Wheel, Cape Coral, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/569,293

(22) Filed: Sep. 12, 2019

(65) Prior Publication Data

US 2020/0005374 A1 Jan. 2, 2020

Related U.S. Application Data

(63) Continuation of application No. 16/261,853, filed on Jan. 30, 2019, which is a continuation of application No. 15/003,135, filed on Jan. 21, 2016, now Pat. No. 10,217,150.

(60) Provisional application No. 62/147,967, filed on Apr. 15, 2015.

(51) Int. Cl.
*G06Q 10/00* (2012.01)
*G06Q 30/06* (2012.01)
*G06Q 30/02* (2012.01)
*G06Q 10/10* (2012.01)

(52) U.S. Cl.
CPC ..... *G06Q 30/0611* (2013.01); *G06Q 10/1095* (2013.01); *G06Q 30/0283* (2013.01)

(58) Field of Classification Search
CPC .......... G06Q 30/0611; G06Q 30/0283; G06Q 10/20; G06Q 10/1095
USPC ............................................... 705/7.11–7.22
See application file for complete search history.

(56) References Cited

U.S. PATENT DOCUMENTS

| | | | |
|---|---|---|---|
| 7,177,825 B1 * | 2/2007 | Borders | G06Q 10/0631 705/26.81 |
| 7,636,676 B1 * | 12/2009 | Wolery | G06Q 30/02 705/26.4 |
| 7,921,041 B1 | 4/2011 | Wolery et al. | |
| 8,239,229 B1 * | 8/2012 | Paiz | G06Q 10/083 705/7.11 |

(Continued)

OTHER PUBLICATIONS

Tire Business, Openbay-app-improves-B2C-communication, Nov. 25, 2015, downloaded on May 30, 2019 from https://www.tirebusiness.com/article/20151125/NEWS/151129951/openbay-app-improves-b2c-communication.*

(Continued)

*Primary Examiner* — Eric W Stamber
*Assistant Examiner* — George H Walker, III
(74) *Attorney, Agent, or Firm* — Maier & Maier, PLLC

(57) ABSTRACT

An auto repair quote platform may be provided. The platform may allow a user to enter a set of parameters and request quotes from service providers based on those parameters. Service providers may also enter parameters for matching their quotes to a request. The platform may further allow a user to accept a quote and schedule an appointment with the chosen service provider.

11 Claims, 21 Drawing Sheets

(56) References Cited

U.S. PATENT DOCUMENTS

| | | | | |
|---|---|---|---|---|
| 8,650,068 | B2* | 2/2014 | Esser | G06Q 30/02 701/31.8 |
| 2001/0027481 | A1* | 10/2001 | Whyel | G06Q 10/109 709/218 |
| 2002/0111844 | A1* | 8/2002 | Vanstory | G06Q 10/06 705/7.13 |
| 2003/0028419 | A1* | 2/2003 | Monaghan | G06Q 10/06 705/7.12 |
| 2003/0120530 | A1* | 6/2003 | Casati | G06Q 10/10 705/7.11 |
| 2004/0073468 | A1* | 4/2004 | Vyas | G06Q 10/0631 705/7.13 |
| 2004/0102983 | A1* | 5/2004 | Carlson | G06Q 10/04 705/7.19 |
| 2006/0242089 | A1* | 10/2006 | Vahidi | G06Q 10/10 705/400 |
| 2007/0078697 | A1* | 4/2007 | Nixon | G06Q 10/063116 705/7.16 |
| 2009/0089134 | A1* | 4/2009 | Uyeki | G06Q 10/02 705/7.19 |
| 2009/0254454 | A1* | 10/2009 | Gupta | G06Q 30/0601 705/26.1 |
| 2010/0228618 | A1* | 9/2010 | Mitchell | G06Q 30/0239 705/14.39 |
| 2011/0313806 | A1* | 12/2011 | Huang | G06Q 10/109 705/7.19 |
| 2011/0313951 | A1* | 12/2011 | Cook | G06Q 10/04 705/400 |
| 2012/0059774 | A1* | 3/2012 | Morita | G06Q 30/0283 705/400 |
| 2012/0123951 | A1* | 5/2012 | Hyatt | G06Q 10/10 705/305 |
| 2012/0136743 | A1* | 5/2012 | McQuade | G06Q 30/0611 705/26.3 |
| 2013/0073326 | A1* | 3/2013 | Jordan | G06Q 10/06 705/7.11 |
| 2013/0282511 | A1* | 10/2013 | Mitchell | G06Q 30/0611 705/26.4 |
| 2014/0095262 | A1* | 4/2014 | Barry | G06Q 30/0206 705/7.35 |
| 2014/0136264 | A1 | 5/2014 | Kinsey, II | |
| 2014/0136266 | A1* | 5/2014 | Kinsey, II | G06Q 10/063116 705/7.19 |
| 2014/0278660 | A1* | 9/2014 | D'Amico | G06Q 10/06311 705/7.17 |
| 2014/0279169 | A1* | 9/2014 | Leos | G06Q 30/0611 705/26.4 |
| 2015/0081161 | A1* | 3/2015 | Chapman | G07C 5/008 701/31.5 |
| 2015/0262114 | A1* | 9/2015 | Ming | G06Q 10/063114 705/7.15 |
| 2016/0125366 | A1* | 5/2016 | McCaffrey | G06Q 10/1095 705/7.19 |
| 2016/0140507 | A1* | 5/2016 | Stevens | G06Q 10/1095 705/7.19 |

OTHER PUBLICATIONS

Selected pages from the RepairPal website dated Oct.-Dec. 2019 downloaded May 30, 2019 via web.archive.org.*

Auto Repair and Maintenance Estimates/Auto Shop and Mechanic Rating; http://repairpal.com/; dated Apr. 7, 2015; 2 pgs.

InstantEstimator.com; http://www.instantestimator.com/howitworks. html; dated Apr. 7, 2015; 2 pgs.

DriverSide; http://www.driverside.com/auto-mechanics/reh_motors-1738882-appoin . . . ; dated Apr. 7, 2015; 2 pgs.

Pat Goss, "Repair Pal", Oct. 30, 2013, downloaded on Dec. 8, 2018 from www.motorweek.org >Features> Goss' Garage; 16 pgs.

repairpal.com, selected webpages May and Jun. 2015, downloaded Dec. 8, 2018 via internetarchive.com; 4 pgs.

EBay Detailed seller Ratings 2007, web page from Aug. 17, 2007 downloaded on Nov. 27, 2016 via web.archive.org at http ://web. arch ive.org/web/2007081 7122529/http ://pages. ebay .com/help/feedback/detailed-sel !er-ratings. html; 1 pg.

Tire Business, Openbay-app-improves-B2C-communication, Nov. 25, 2015, downloaded on May 30, 2019 from https://www.tirebusiness. com/article/20151125/NEWS/151129951/openbay-app-improves-b2c-communication; 8 pages.

Selected pages from the RepairPal website dated Oct.-Dec. 2019 downloaded May 30, 2019 via web.archive.org; 10 pages.

* cited by examiner

AUTO REPAIR QUOTE PLATFORM

CROSS-REFERENCE TO RELATED APPLICATIONS

The present patent application claims benefit and priority to U.S. patent application Ser. No. 16/261,853 entitled "AUTO REPAIR QUOTE PLATFORM" filed on Jan. 30, 2019; U.S. patent application Ser. No. 15/003,135 entitled "AUTO REPAIR QUOTE PLATFORM" filed on Jan. 21, 2016, now U.S. Pat. No. 10,217,150, issued on Feb. 26, 2019; and U.S. Provisional Patent Application No. 62/147,967 entitled "AUTO REPAIR QUOTE PLATFORM" filed on Apr. 15, 2015, which is hereby incorporated by reference into the present disclosure.

BACKGROUND

Consumers seeking to have their vehicle serviced or repaired are often frustrated by a large degree of uncertainty about how much the work they would like to have done will cost. They often find that repair cost estimates for the work vary widely between vehicle repair shops, and the estimates they receive might vary significantly from the actual cost of the repairs. Further, such estimates are often not immediately available to the consumer; they may need to call into a repair shop and have a conversation with a mechanic about their problem, or may even need to take in the vehicle to each repair shop to have it looked at before an estimate will be given. Because it would be extremely time-intensive for a consumer in need of vehicle repair work to solicit estimates—much less do some level of background research about the repair shop they solicited the estimate from to ensure that it is accurate—consumers often must settle for paying significantly more than they could otherwise pay to have work done on their vehicles.

Some services have attempted to address this problem. For example, some web interfaces have been able to make available to consumers a range of estimates for a particular service, so that consumers can at least attempt to identify a good deal. Others provide users with information about how to identify the potential sources of the problem and important symptoms that they should look for, potentially streamlining the process of soliciting estimates from many different firms. However, consumers still do not have a service available to them that allows them to accurately search for and compare quotes, not estimates, from a number of different repair shops in their area without manually collecting the quotes from all of the different shops themselves.

SUMMARY

An auto repair quote platform may be provided. The platform may allow a user to enter a set of parameters and request quotes from service providers based on those parameters. Service providers may also enter parameters for matching their quotes to a request. The platform may further allow a user to accept a quote and schedule an appointment with the chosen service provider.

Such a method may comprise: storing, on a server, for each of a plurality of automotive service providers, a service provided by the automotive service provider, and quote information provided by the automotive service provider and corresponding to that particular service, wherein each stored service is selected from a set of predefined services, and wherein the quote information is individual to each automotive service provider; maintaining, by the server, an aggregator database of updated available service provider appointment data that is associated with and individual to each automotive service provider, wherein maintaining the database comprises: receiving, by the server, scheduling information for an automotive service provider, said automotive service provider scheduling information being provided in the form of available unfilled timeslots and automotive service provider operating hours, storing, by the server, in the aggregator database, the received automotive service provider scheduling information, and associating the received automotive service provider scheduling information with an automotive service provider, receiving, by the server, new automotive service provider scheduling information indicating a booked appointment, and updating, by the server, the available service provider appointment data in the aggregator database by modifying at least one unfilled timeslot to a filled timeslot indicating the booked appointment; receiving, by the server and from a user interface, a service request from a customer identifying a service selected from the set of predefined services; processing, by the server, the service request, for each automotive service provider having the identified service stored in the aggregator database, wherein processing comprises: generating, from the stored automotive service provider scheduling information, a plurality of individual start times, displaying, on the user interface, the plurality of individual start times, and determining if there is quote information corresponding to the identified service and the selected automotive service provider, and if so displaying said quote information on the user interface; receiving, on the server, a customer-selected automotive service provider and a customer-selected start time; and booking a service appointment at the customer-selected automotive service provider at the customer-selected start time and for the identified service request, wherein booking comprises: receiving, by the server and from a user interface, a customer address for an electronic communication, sending, via the server, an electronic communication providing information on the appointment, and updating the available service provider appointment data in the aggregator database by modifying at least one unfilled timeslot to a filled timeslot indicating the booked appointment.

BRIEF DESCRIPTION OF THE DRAWINGS

Advantages of embodiments of the present invention will be apparent from the following detailed description of the exemplary embodiments. The following detailed description should be considered in conjunction with the accompanying figures in which:

FIG. 16A shows an exemplary "light switch" interface.

DETAILED DESCRIPTION

Figure 1:
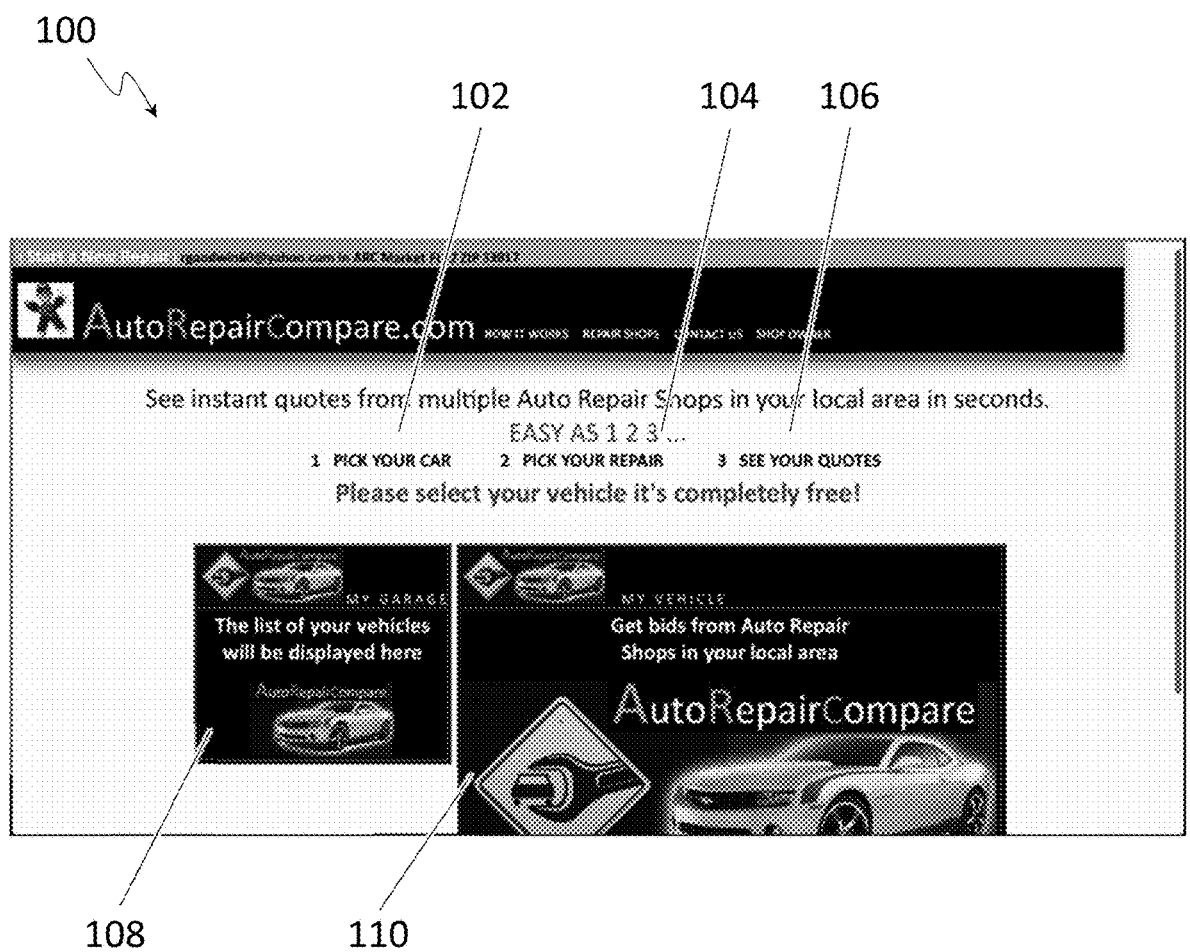
FIG. 1 shows an exemplary graphical user interface.

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein may be described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

According to an exemplary embodiment, an auto repair quote platform may be provided. The platform may provide users with quotes from specific service providers and may connect users and service providers to establish appointments. The system may utilize software implemented by a processor configured to perform the functions described herein. In some exemplary embodiments, the system may be a web-based platform and may run on cloud-based infrastructure. This may allow the platform to be scaled as required. The system may further include at least one database server optionally containing user information, vehicle and parts information, repair shop information, and/or parts supplier information. Various parties may interact with the system over a network, such as users, repair shops, and parts suppliers. Users may refer to individuals or entities seeking repair services for a vehicle. These parties may interact with the system through specific user interfaces, including websites, software applications, and mobile software applications. The system may further be integrated with users' social networking accounts. In a web-interface embodiment, there may be separate login capabilities for the different parties, such as users and shop owners.

Referring to the Figures generally, a user may optionally create an account, which may include a login to access the platform. The user may enter desired identifying information and contact information, such as an e-mail address or phone number, which may be used to confirm selections and interactions made through the platform. In some embodiments, a user may be able to use the platform without a login. In embodiments without a login, the user's historical data, such as the user's vehicle information, may not be saved.

In operation, a user may enter a set of parameters, which may define results presented through the platform. These parameters may include vehicle information, geographic information, desired service or repair information, timing information, pricing information, and other relevant information as would be understood by a person having ordinary skill in the art. Once desired parameters have been established, the platform may return a list of results comporting with the parameters. The results may include a price quote for performing the desired repair or services. The quote may be a definite price, not an estimate or price range. The user may compare the quotes and the shops offering them and may optionally accept a quote.

Detailed functions and capabilities provided by the platform may be described with reference to exemplary user interfaces of the platform as follows.

Referring to exemplary FIG. 1, an exemplary graphical user interface requesting a client to identify a vehicle and a desired service or repair ("GUI") 100 may be provided. According to an exemplary embodiment, upon navigating to the interface, a user may be presented a page similar to that provided in FIG. 1. GUI 100 may prompt the user to select a car 102, to select a desired service or repair 104, and to then see quotes from a number of auto repair shops in their local area 106. Optionally, the GUI 100 may provide the user with a list of all of the vehicles that they have registered with the site 108, and may provide the user with a list of all of the auto repair shops offering a desired service and located within a desired area 110.

GUI 100 may also prompt a user to enter login information for the site, such as an email address or username and a password. If the user does not have any login information for the site, the GUI 100 may prompt the user to create some, as well as entering any other details that may be necessary for the user to use the site. The GUI 100 may be linked to a database that stores the user's login information as well as information that the user may be capable of inputting in some embodiments, such as the user's name, the user's location, the list of vehicles that the user owns or has owned (the user's "garage"), any other contact information linked to the user, and any payment information linked to the user. When a user enters their login information, the GUI 100 software may retrieve this information from the database and populate the list of the user's vehicles 108 from the records of the user's garage, and populate the list of auto repair shops in the user's area 110 from the records of the user's location and the records of auto repair shops in that area.

Figure 2:
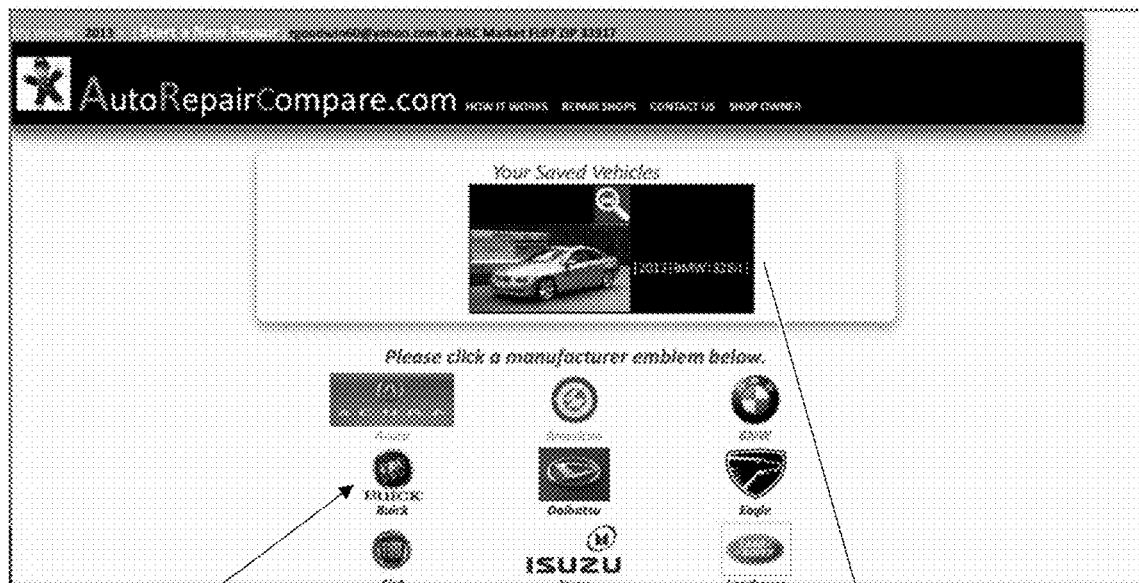
FIG. 2 shows an exemplary graphical user interface.

Referring now to exemplary FIG. 2, an exemplary GUI 200 may display a list of the user's saved vehicles and request that they enter any new vehicle information if any is available. According to one exemplary embodiment, saved vehicles 202 may be displayed as a list near the top of the GUI 200; the list of saved vehicles 202 may include the vehicles' make, model, year, color, recent service history, or any other pertinent information, and may include a picture of the vehicle or of a close match to the vehicle, for example another vehicle of the same make and model.

GUI 200 may also allow the user to select a new vehicle to be repaired or serviced, for example through a menu or from a set of icons 204. According to an embodiment in which a user is presented with a set of icons 204, icons may be presented in stages, and a first set of icons 204 may indicate the manufacturer of the vehicle in question. Clicking on the icons 204 may lead the user to a second set of icons or inputs, which may allow the user to specify more specific information about their vehicle. For example, if a user has a 2013 BMW 328i, they may first select the "BMW" icon from the set of icons displaying vehicle manufacturer logos 204, which may then cause the GUI 200 to display a set of BMW vehicle models that a user may select from.

Figure 3:
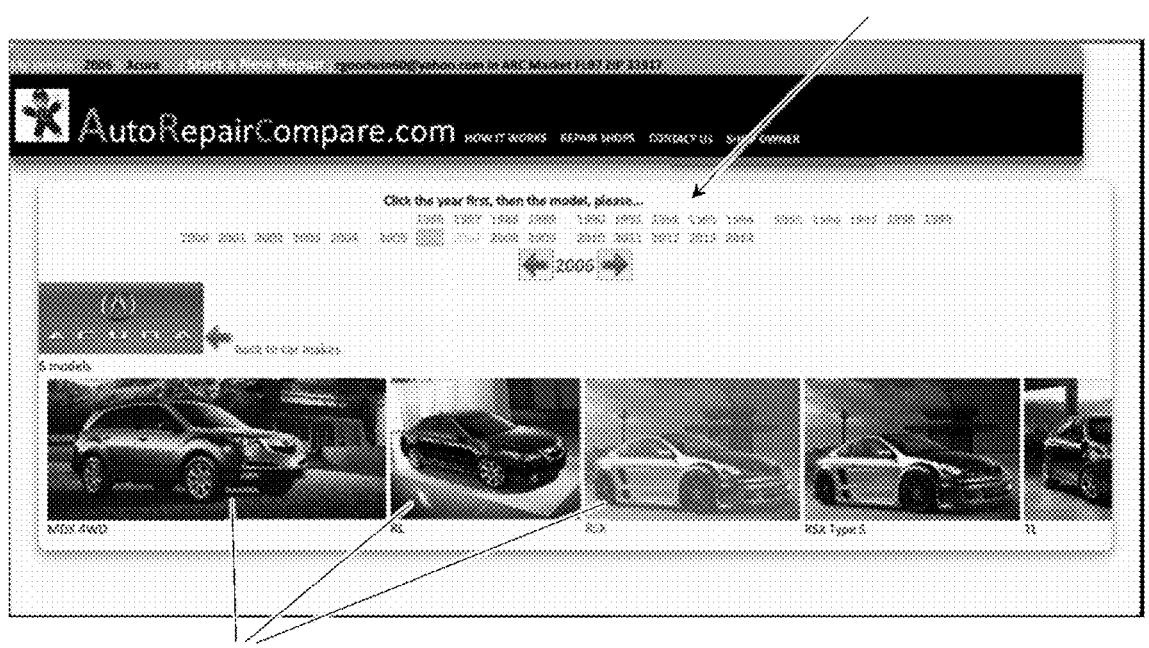
FIG. 3 shows an exemplary graphical user interface.

Referring now to exemplary FIG. 3, an exemplary GUI 300 may display a list of the vehicles made by a manufacturer 302 and may further present a list of years that the vehicle model selected was made 304. For example, in this particular case, the selected model, the Acura MDX 4WD, was manufactured from 2000 to the current time, and has model years from 2001 to the present. A user may be able to select any year from 2001 to the present 304, causing the GUI 300 to retrieve from a database a list of models produced by Acura in that year that includes the MDX 4WD. All other models produced in that year, for example the year 2006 as is the case in FIG. 3, may be displayed alongside it 302. Alternatively, a user may select the model of the vehicle 302 first, and then the year 304; for example, a user may be able to select the MDX 4WD, and may then be shown and may be able to select from any of the years in which the MDX 4WD was manufactured.

Figure 4A:
FIG. 4A shows an exemplary graphical user interface.
Figure 4B:
FIG. 4B shows an exemplary graphical user interface.

As shown in exemplary FIG. 4A-4B, a menu 402 of available repairs 404 may be presented to a user through interface 400. The repairs shown may only be repairs that are immediately available for a quote within the parameters entered by the user. For example, if no shop within a geographic parameter is currently offering alternator replacement, that service may not be presented in the menu. In some alternative exemplary embodiments, alternator replacement may still be presented in the menu, however, when selected the platform may return zero results. Additionally, an input for viewing and selecting from previous repairs 410 may be presented through interface 400. In some further embodiments, additional information 420 about menu options may be presented when a user's curser hovers over a menu item or selects an item.

Figure 5:
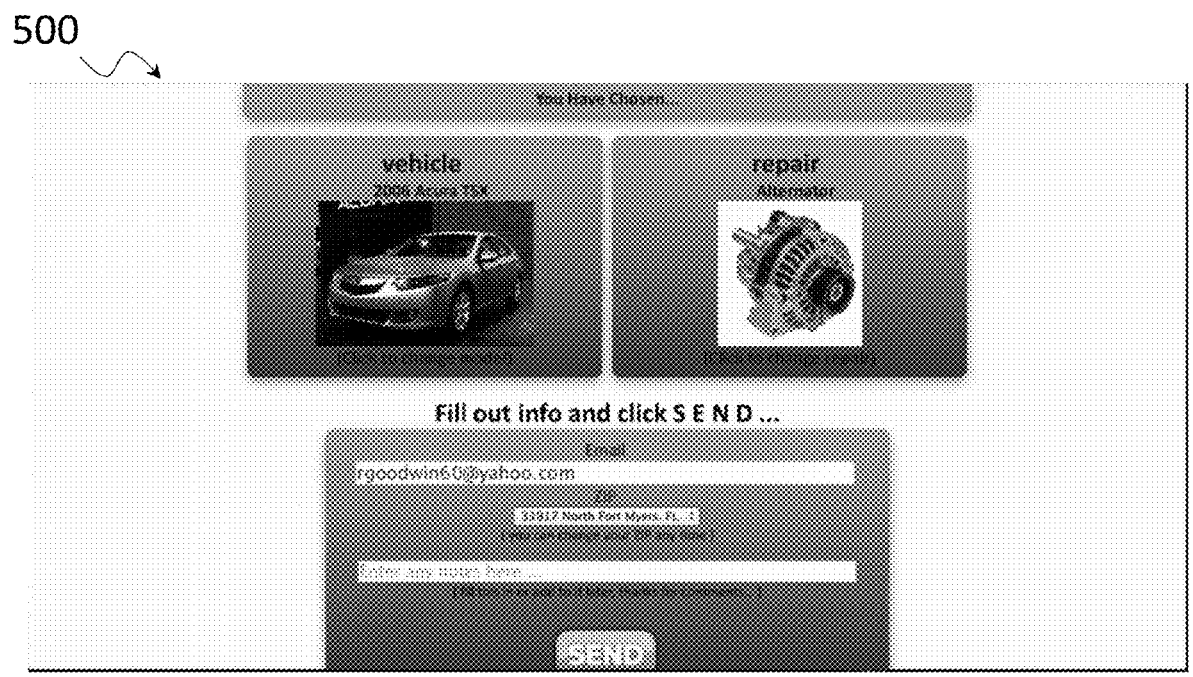
FIG. 5 shows an exemplary graphical user interface.

Now referring to exemplary FIG. 5, an interface 500 may be shown once a service has been selected. Interface 500 may allow a user to enter identifying/contact information, geographic information, and any other information or notes to be submitted with the inquiry. While the user may input identifying/contact information, such as an e-mail address, at this stage, it may still be withheld from service providers until after a service provider appointment has been selected by the user. Once a user has entered the desired information, the user may select a send or submit button to initiate the inquiry.

Figure 6A:
FIG. 6A shows an exemplary graphical user interface.
Figure 6B:
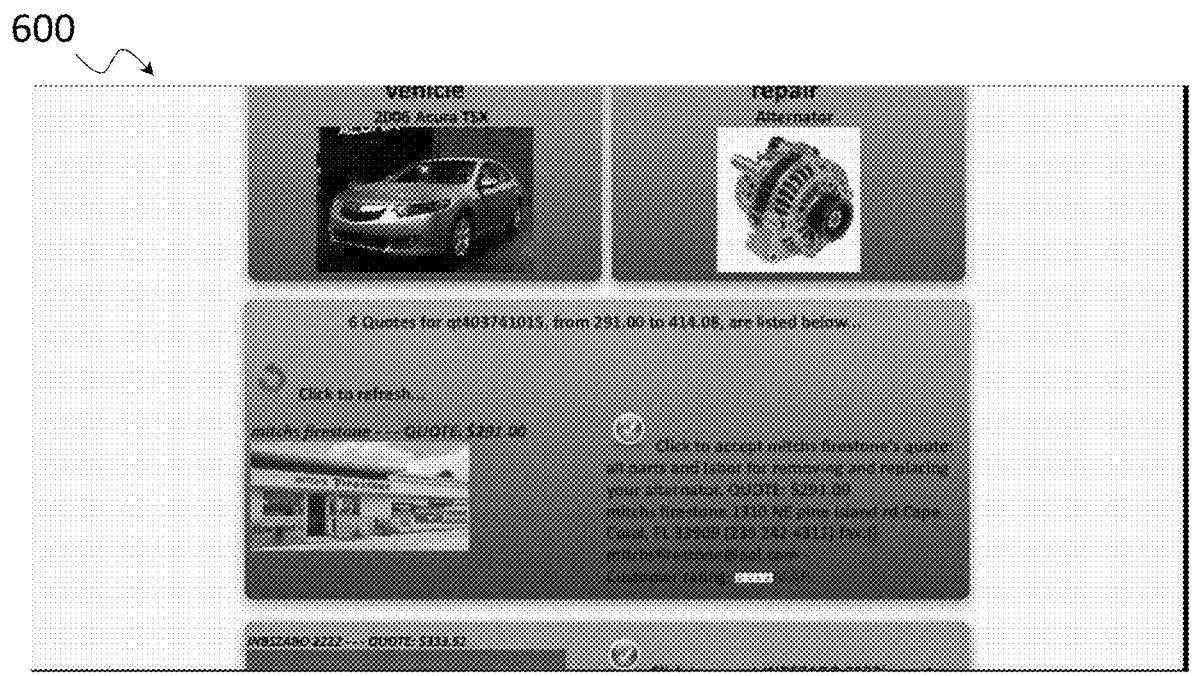
FIG. 6B shows an exemplary graphical user interface.
Figure 6C:
FIG. 6C shows an exemplary graphical user interface.
Figure 7:
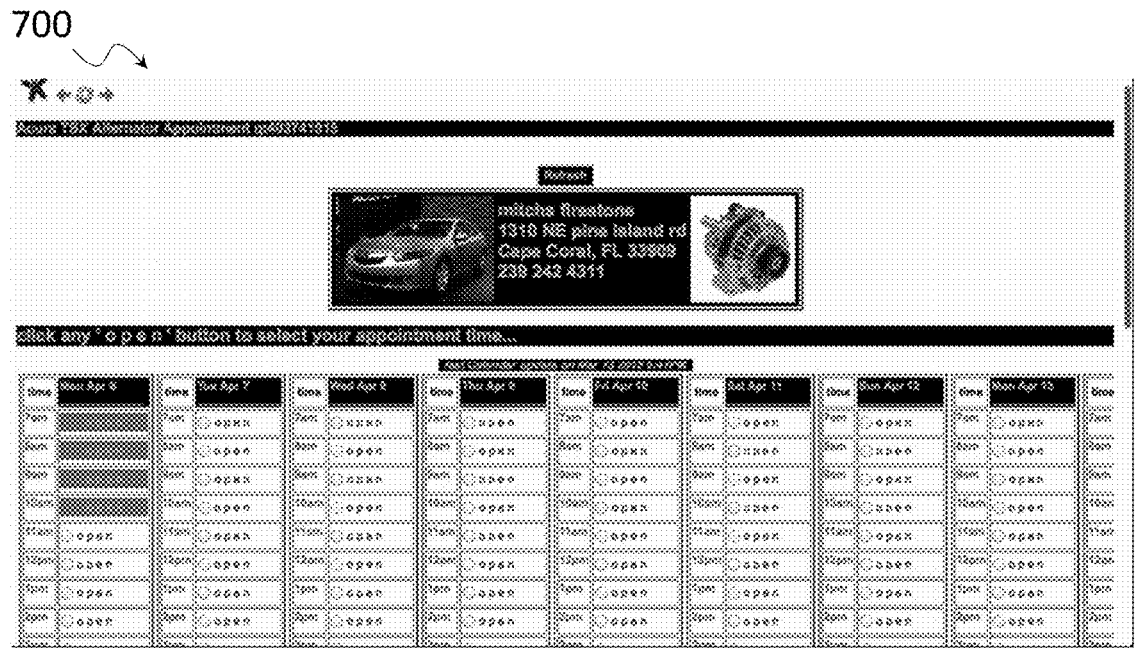
FIG. 7 shows an exemplary graphical user interface.

As shown in exemplary FIG. 6A-6C, an interface 600 may provide results to the user. The results may be in the form of a list of quotes. Interface 600 may further show a request identifier, request information, vehicle information, service/repair information, a price range encompassing all of the quotes, the number of quotes, and a description of what is included in the quote. There may also be an icon or button for refreshing the results. As shown in FIGS. 6B and 6C, each quote may optionally include the name of the service provider, the quote price, a description of the services, an address and contact information for the service provider, a customer rating for the service provider, and a link to view the service provider on a map. In some further exemplary embodiments a quote may include an image of the service provider. A user may also be able to select a button or icon to view additional service provider information, which may include promotional information created by the service provider, statistical data, and other desired information, as would be understood by a person having ordinary skill in the art. In some embodiments, the link or icon may be the image of the service provider shop. Each quote may also include an acceptance link or icon for accepting a quote.

Once a quote has been accepted, a user may be directed to an appointment selection interface 700. In an exemplary embodiment, the appointment selection interface 700 may show time slots when a service provider is available to accept an appointment. The service provider may maintain the availability so that a user can book, change, or cancel an appointment in real time. In some embodiments, the appointment selection interface 700 may appear as a calendar view with days divided into timeslots of a desired duration. The duration of each timeslot or number of timeslots booked for each service may vary for different services.

Figure 8:
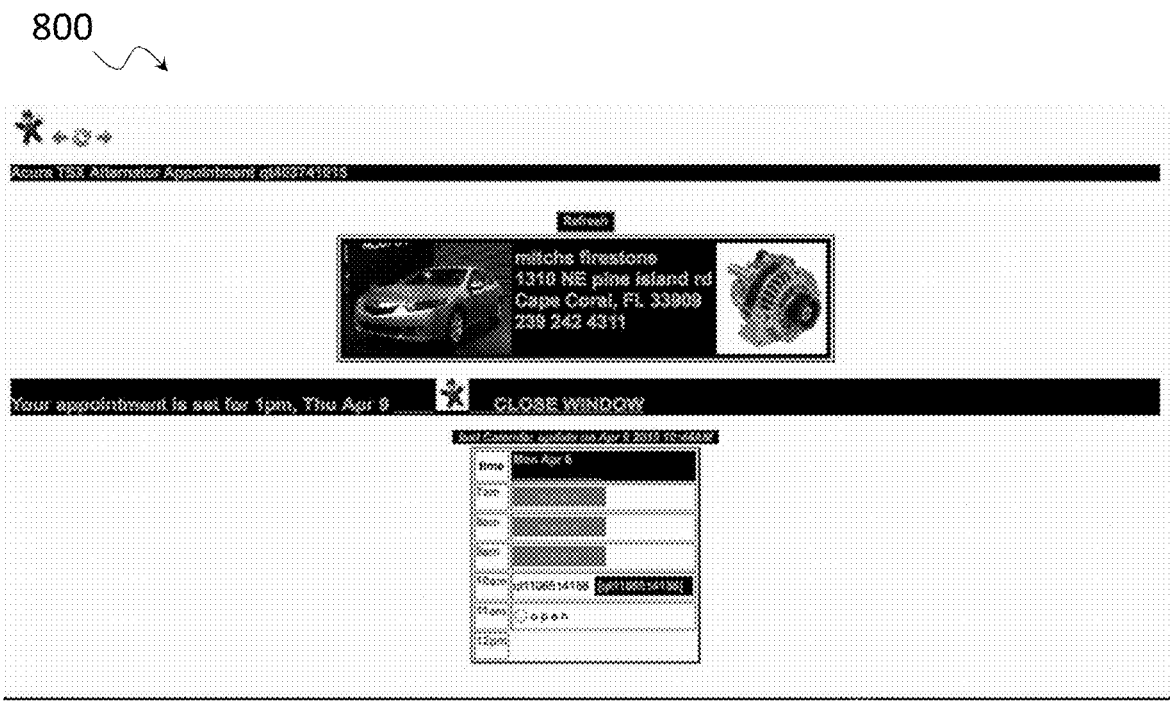
FIG. 8 shows an exemplary graphical user interface.
Figure 9A:
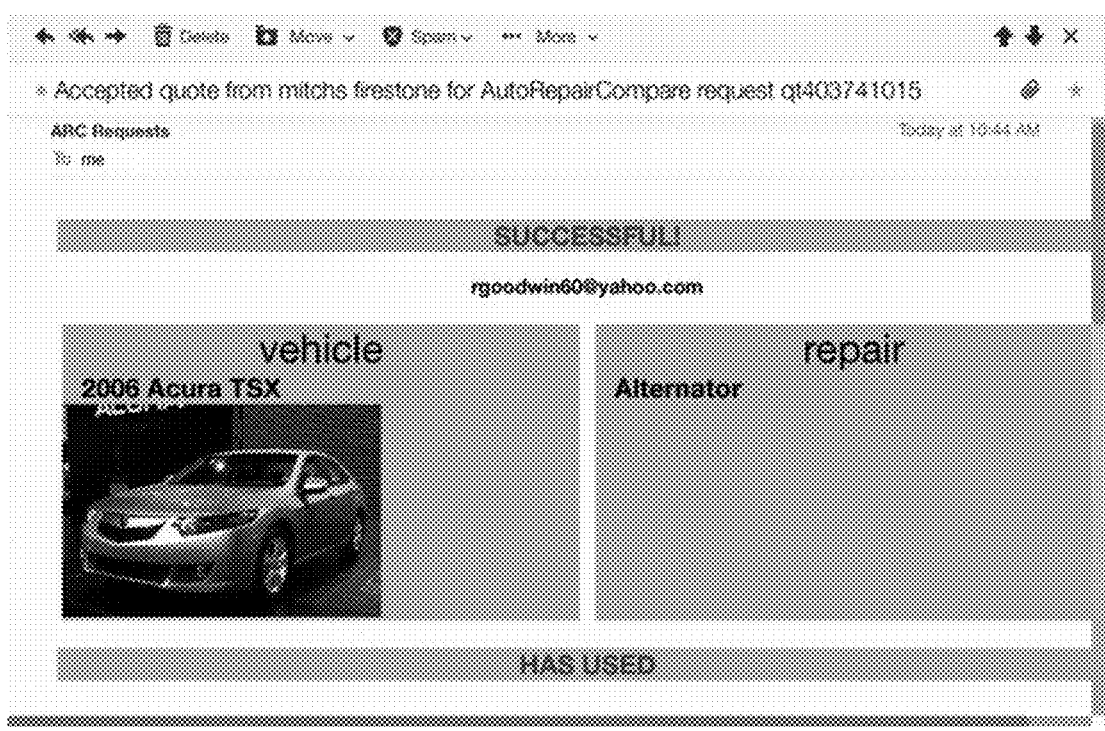
FIG. 9A shows an exemplary graphical user interface.
Figure 9B:
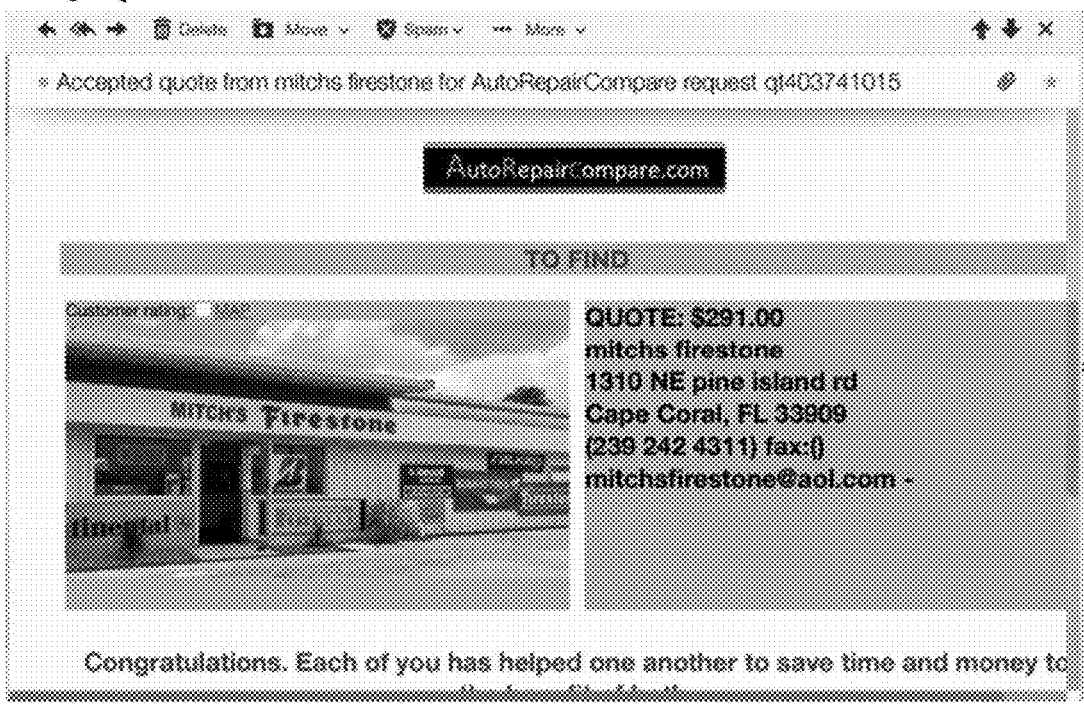
FIG. 9B shows an exemplary graphical user interface.

Exemplary FIG. 8 may show a confirmation window for a booked appointment. Additionally, a user may be sent a confirmation message 900 providing information on the appointment, as shown in exemplary FIG. 9A-9B. Message 900 may be sent in the form of an e-mail, text message, or other comparable message format as would be understood by a person having ordinary skill in the art.

Figure 10:
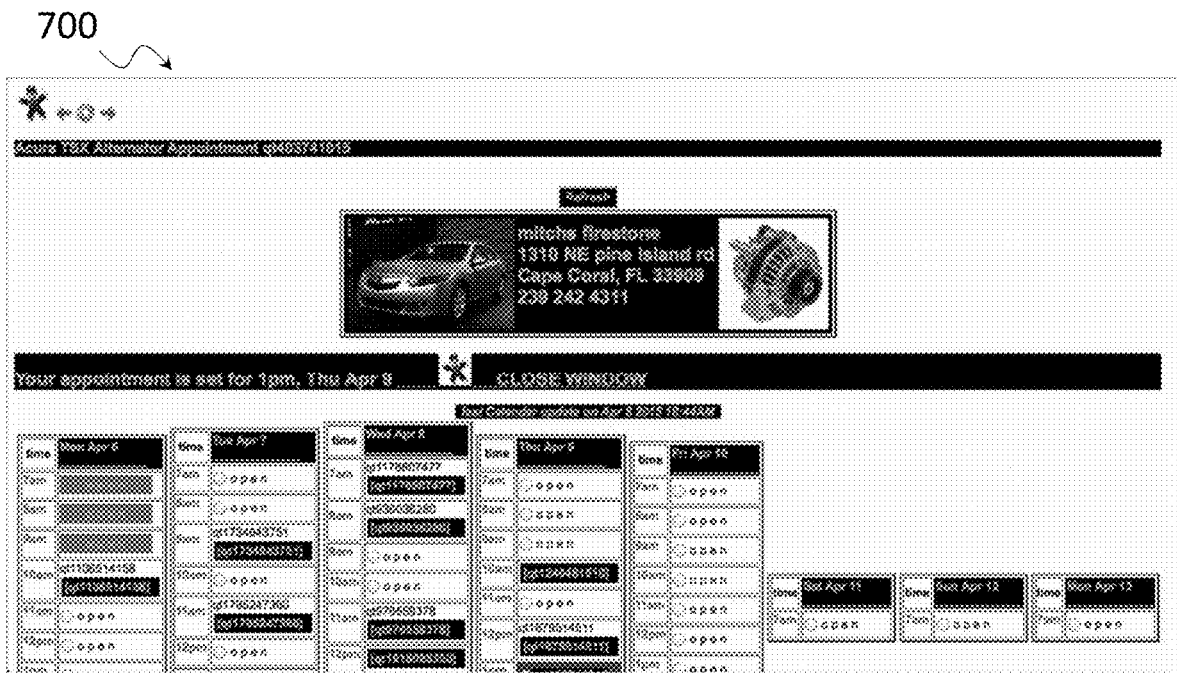
FIG. 10 shows an exemplary graphical user interface.
Figure 11:
FIG. 11 shows an exemplary graphical user interface.
Figure 12:
FIG. 12 shows an exemplary graphical user interface.
Figure 13A:
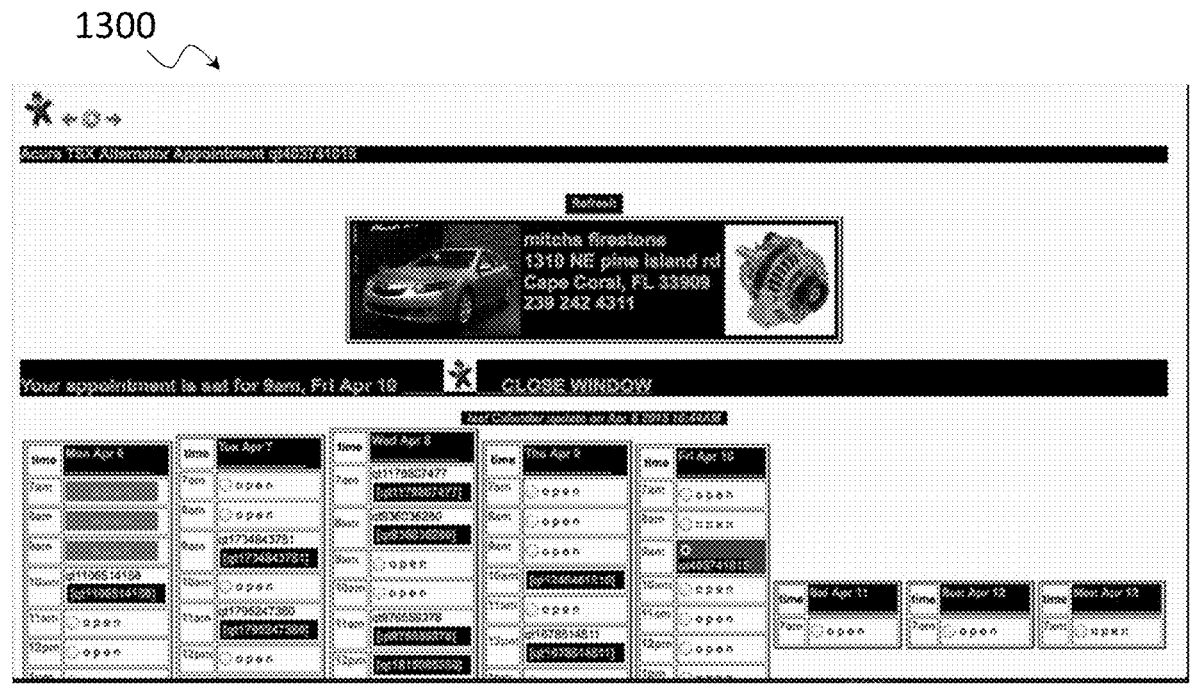
FIG. 13A shows an exemplary graphical user interface.
Figure 13B:
FIG. 13B shows an exemplary graphical user interface.

If a user desires to modify or cancel an appointment, the user may return to the appointment selection interface 700, as shown in FIG. 10. Here, interface 700 may show the current appointment selection and may allow the user to deselect, or uncheck, the appointment time and optionally select a new appointment time.

Now referring to exemplary FIG. 11-13B, a user's home interface 1100 may show their "garage", which may include any vehicles they have previously requested quotes for. A user may select a vehicle from the garage to view all requests made for that vehicle. A user may be presented with past and/or present service requests. For present service requests, an interface 1200 may show the service requested and, if applicable, the selected service provider and any appointment details. The user may additionally be provided a comment interface to add a comment to the service request, which may be viewed by a service provider. A user may also be provided an icon or link to access the quote details. Yet further, a user may be provided an icon or link to access the appointment calendar interface 1300 to view, modify, or cancel the appointment. The calendar interface 1300 may also optionally present a depiction 1350 of the service provider's shop front for recognition and assessment by a user.

Figure 14:
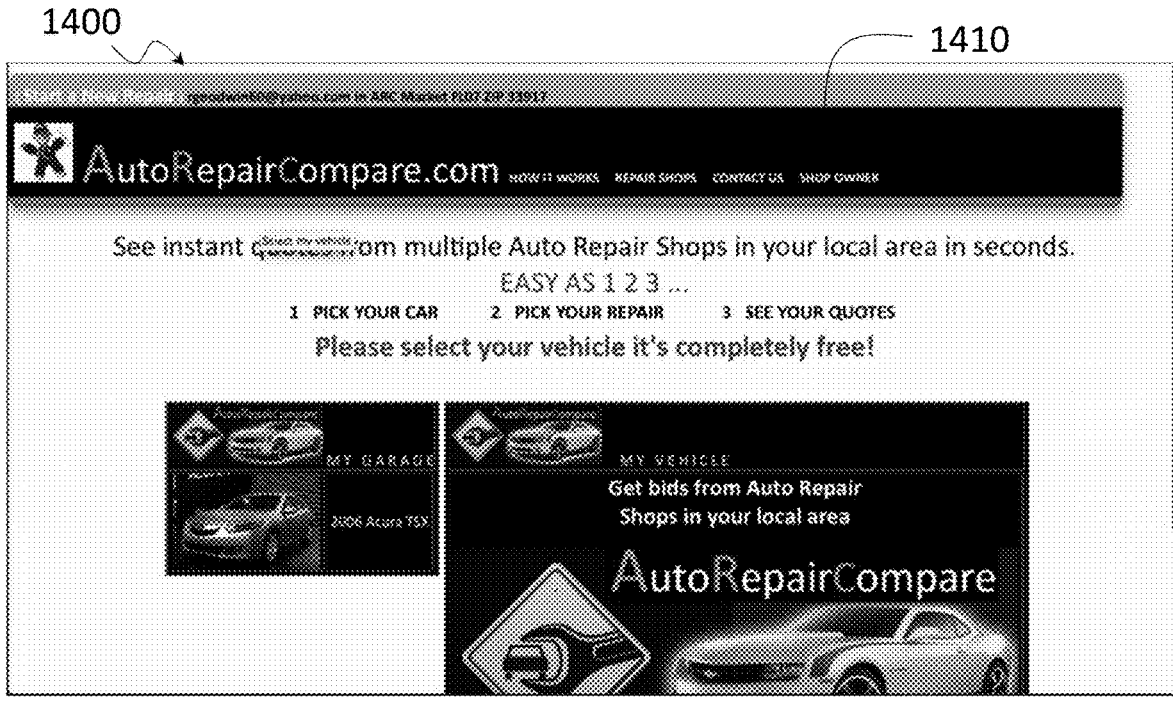
FIG. 14 shows an exemplary graphical user interface.
Figure 15A:
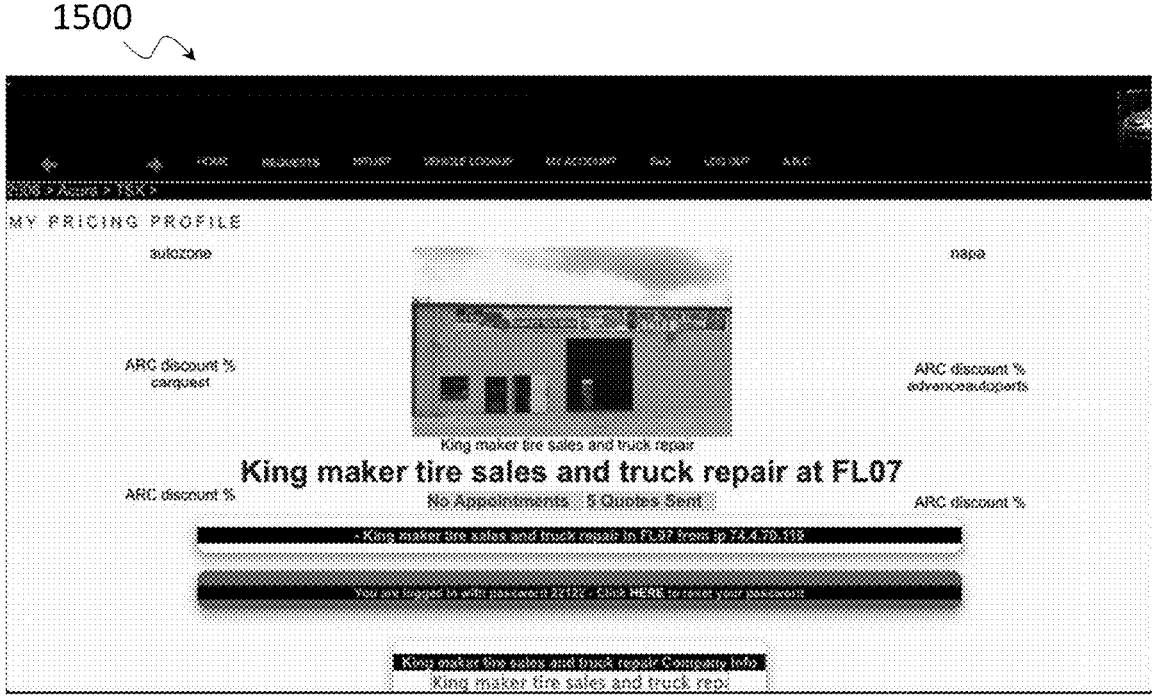
FIG. 15A shows an exemplary graphical user interface.
Figure 15B:
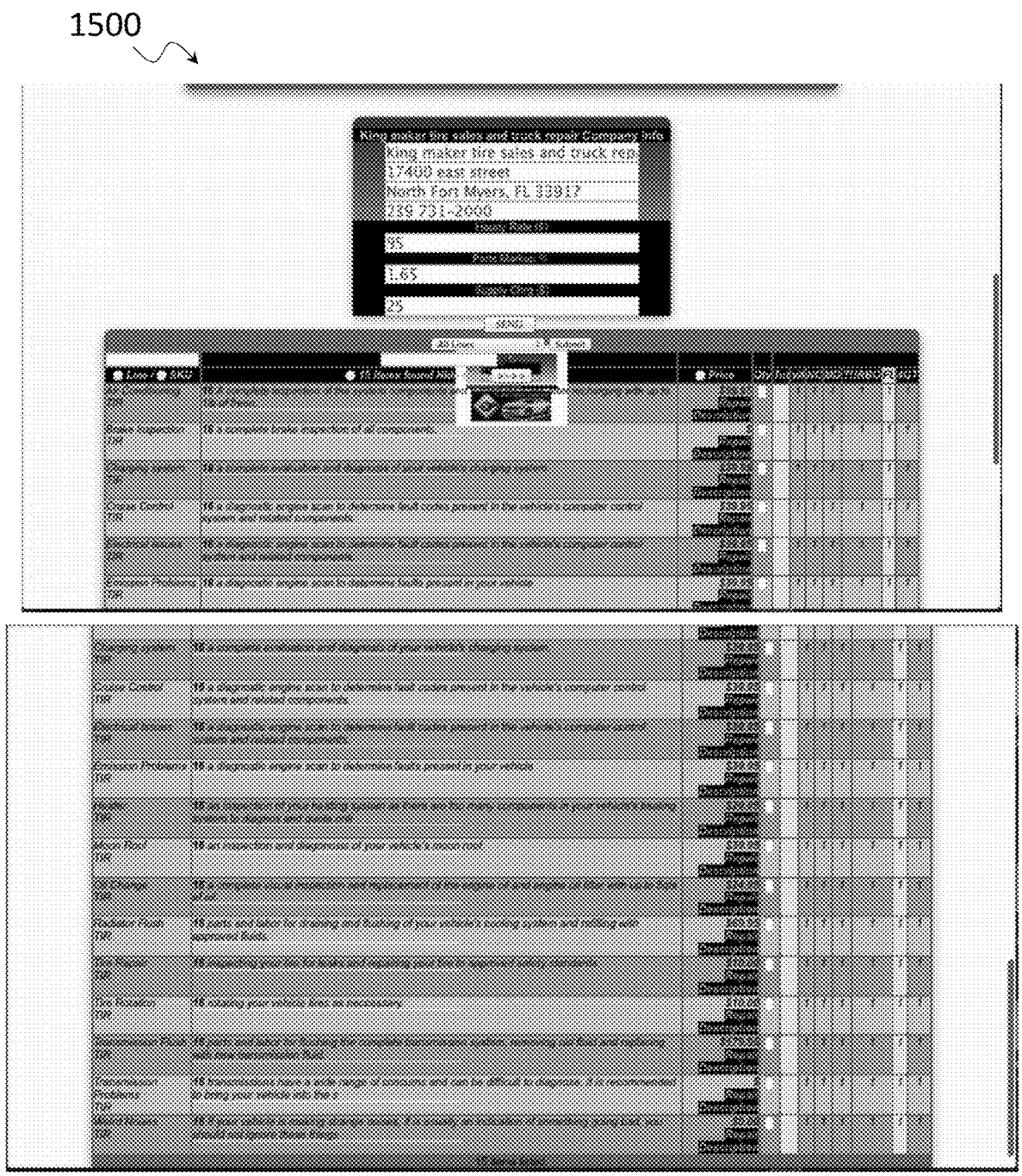
FIG. 15B shows an exemplary graphical user interface.
Figure 15C:
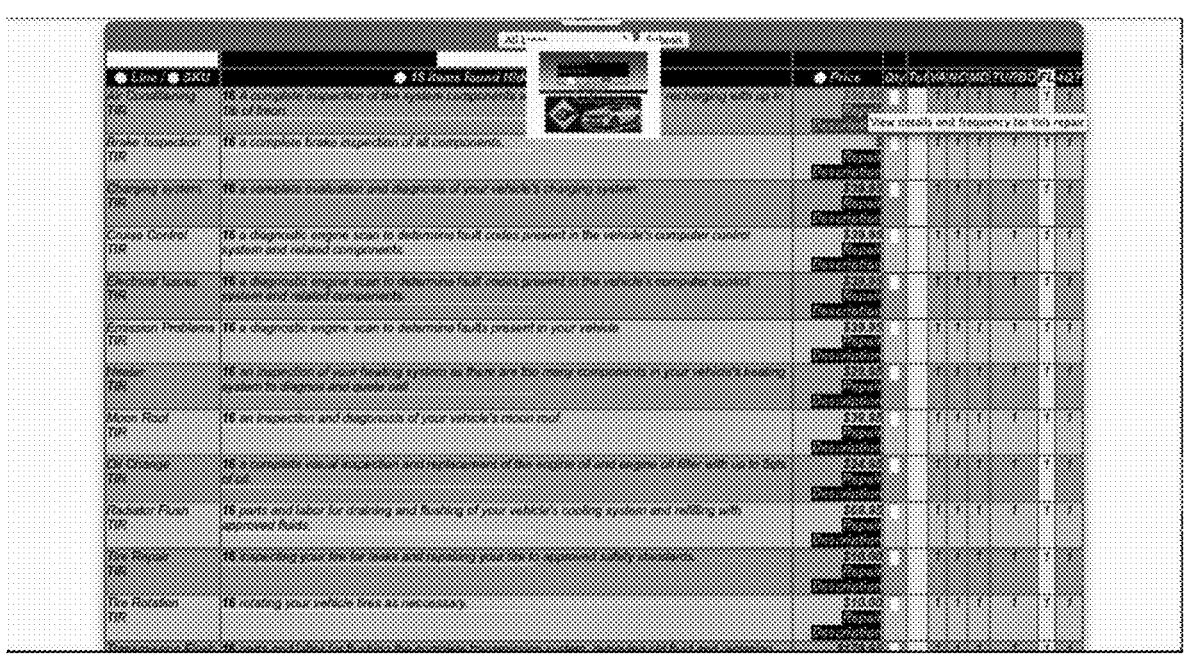
FIG. 15C shows an exemplary graphical user interface.

Now referring to exemplary FIG. 14-15C, a service provider may access the platform through a shop owner section 1410. A service provider may customize the service provider profile and pricing information through an interface 1500. Profile information may include additional selling statements or information on the shop, which may be accessed by a user as referenced above in relation to FIG. 6A-6C. Interface 1500 may show a number of quotes sent and a number of appointments booked. Interface 1500 may also include a price calculator, through which the service provider may input an hourly rate, a parts markup, and a supply charge. In addition to the price calculator, the service provider may set prices for a menu of flat fee services. Interface 1500 may show details and frequency for each flat fee service to assist the service provider in setting a price. The service provider may also reference the ratio of appointments booked to quotes sent in order to determine a competitive price.

Figure 16A:
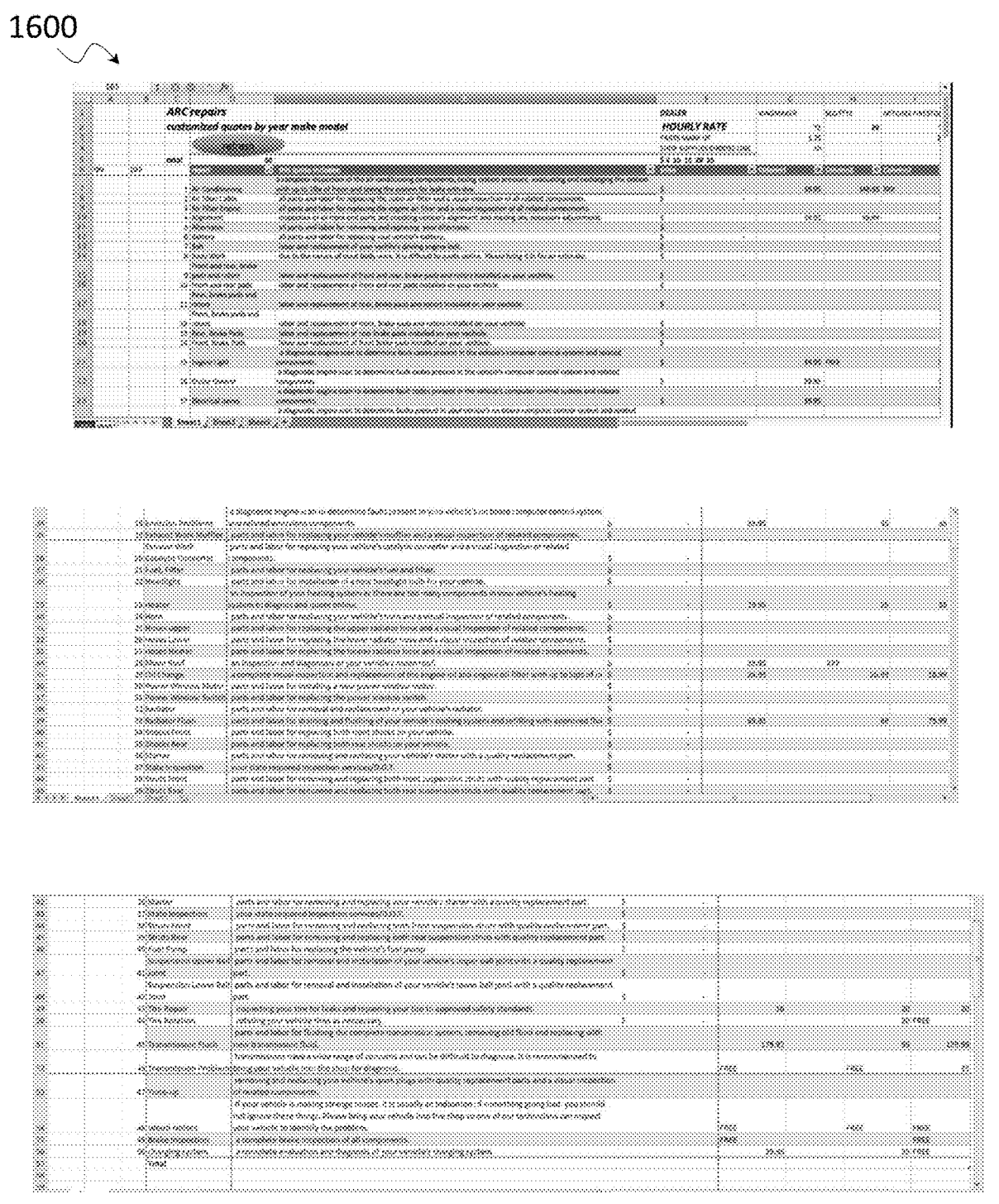
Figure 16B:
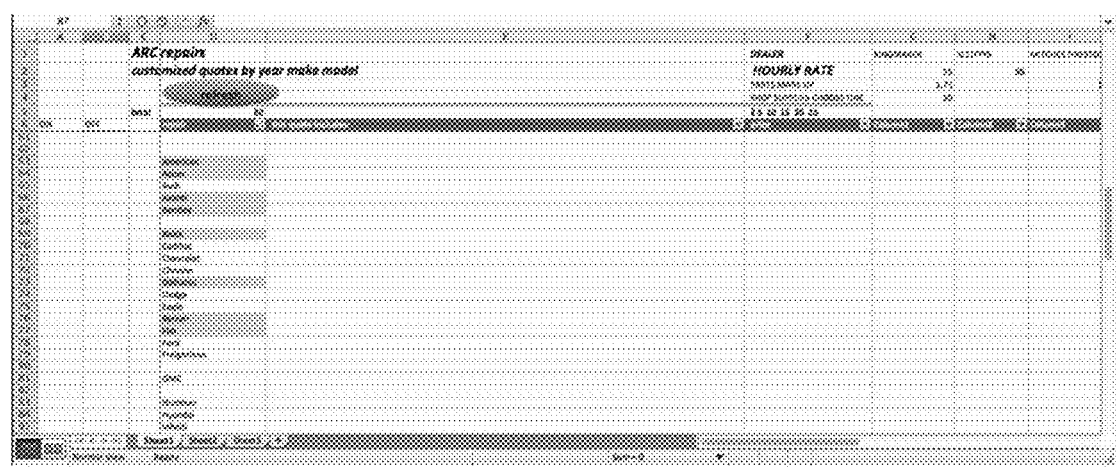
FIG. 16B shows an exemplary "light switch" interface.
Figure 16B:
Figure 16B:
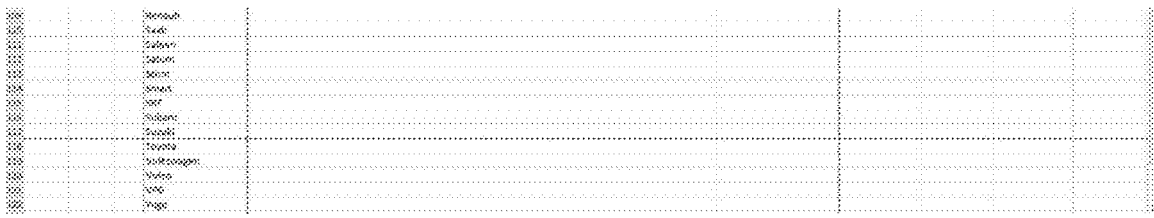

In exemplary FIG. 16A-16B, a "light switch" interface 1600, or secondary interface, through which a service provider may select repairs to offer and adjust prices, may be provided. The light switch interface 1600 may provide a set list of services that may make up a core offering for service providers. A service provider may also input an hourly rate, a parts markup, and a shop supply fee through interface 1600. In an exemplary embodiment, interface 1600 may be presented as a spreadsheet. A service provider may view the menu of services and turn the services on or off In other words, the service provider may choose to offer a quote for that service when a user submits a service request or not offer a quote. In addition, the service provider may adjust the price of each service through interface 1600. Interface 1600 may present additional parameters that a service provider may select to limit or adjust quotes that are sent on behalf of the service provider. For example, a service provider may select certain vehicle manufacturers, models, or years that they choose to provide repairs or service for.

Figure 17A:
FIG. 17A shows an exemplary graphical user interface.
Figure 17B:
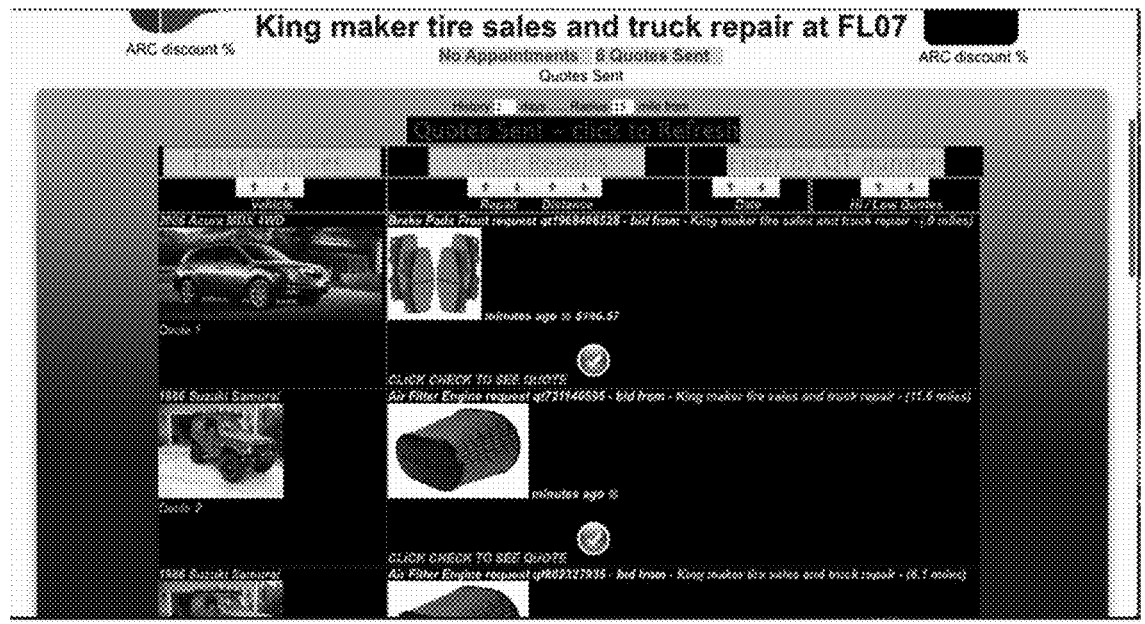
FIG. 17B shows an exemplary graphical user interface.
Figure 17C:
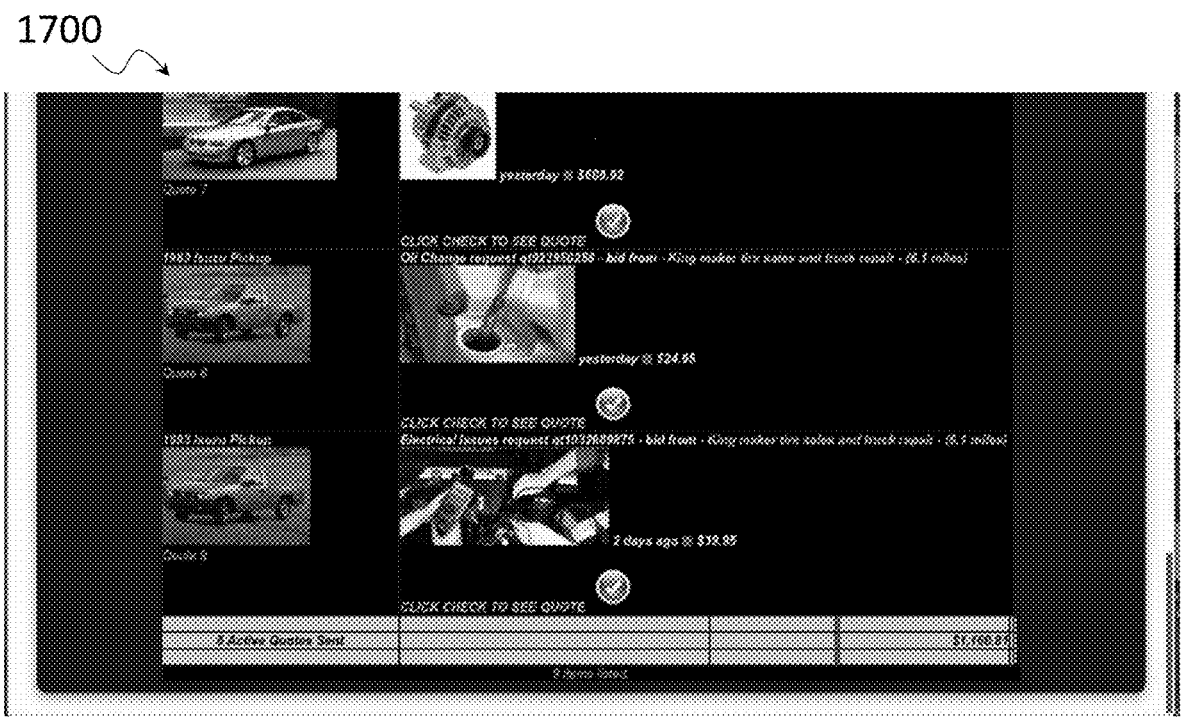
FIG. 17C shows an exemplary graphical user interface.

As referenced above, a service provider may view a number of appointments booked and a number of quotes sent through interface 1500. The service provider may select the appointments booked icon or the quotes sent icon to view a more in depth breakdown. An in depth quote breakdown interface 1700 may be presented in FIG. 17B-17C. The vehicle, service/repair, and price may be shown. A date and time may also be shown. The breakdown interface 1700 may further show cumulative data, including a total dollar amount of quotes sent. Customer information, such as contact information, may not be given to a service provider until a quote has been accepted by the customer.

Figure 18A:
FIG. 18A shows an exemplary graphical user interface.
Figure 18B:
FIG. 18B shows an exemplary graphical user interface.
Figure 18C:
FIG. 18C shows an exemplary graphical user interface.

Now referring to exemplary FIG. 18A-18C, an appointment breakdown interface 1800 may be provided. An appointment breakdown interface 1800 may be accessed through interface 1500 as discussed above. Appointment breakdown interface 1800 may show each accepted appointment and may include the vehicle, the service or repair, the distance from the shop, the appointment details and identifying information of the customer/user. A service provider may also access their appointment calendar 1900 through an icon or link displayed on appointment breakdown interface 1800. In some exemplary embodiments, a service provider and a customer/user may converse through a comment interface 1810, which may be viewed by a service provider through interface 1800. A user may access the comment interface 1810 through interface 1200 shown and described in relation to exemplary FIG. 12.

Figure 19:
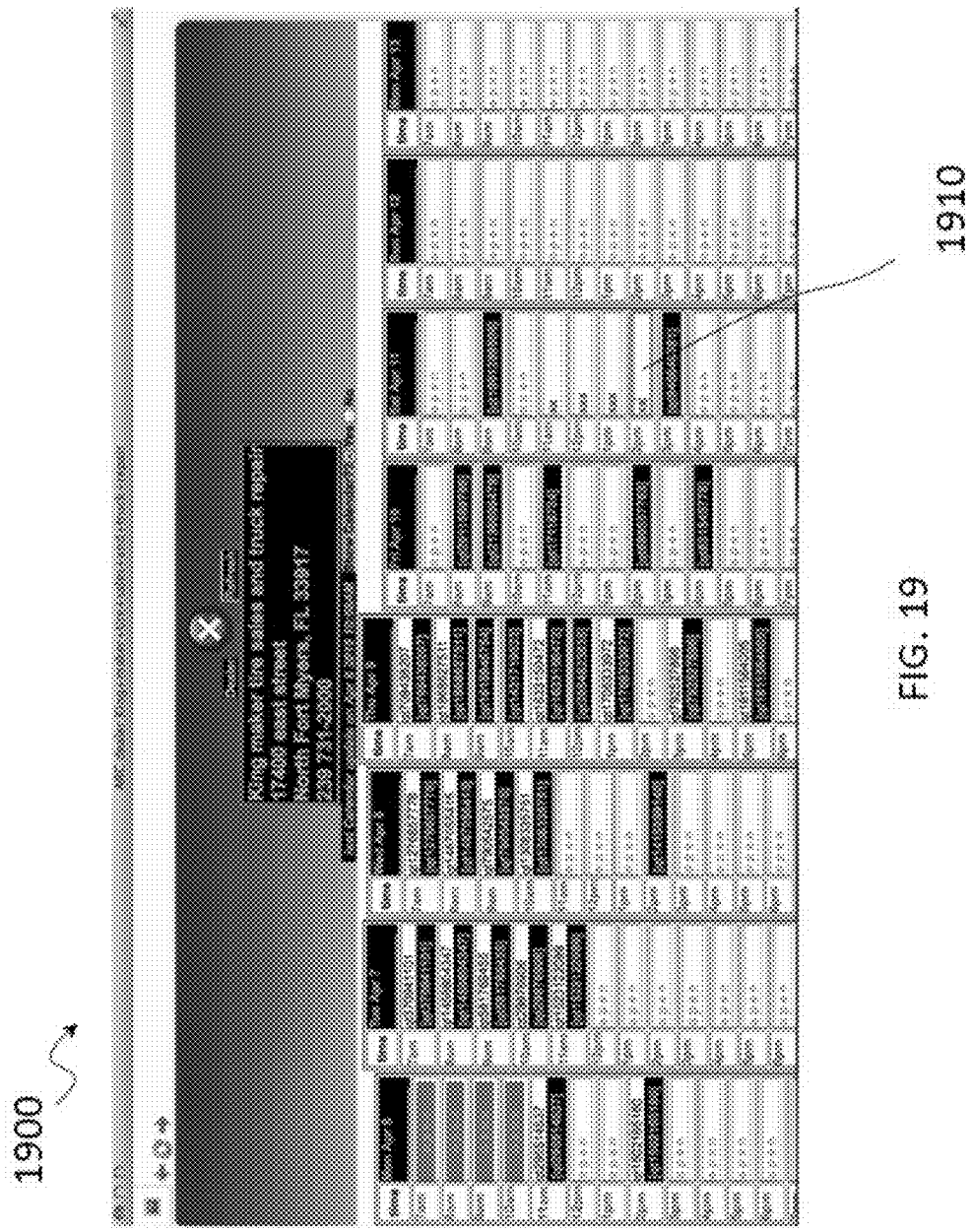
FIG. 19 shows an exemplary graphical user interface.

A service provider's appointment calendar 1900 may be shown in exemplary FIG. 19. The service provider may view their accepted appointments through the appointment calendar 1900. In some embodiments, the service provider may be able to modify or cancel accepted appointments through calendar 1900. The service provider may also block out 1910 appointment times as unavailable through calendar 1900. This may prevent a customer/user from selecting an appointment time that conflicts with a service provider's desired schedule.

Additional parameters may be set by users and service providers, as would be understood by a person having ordinary skill in the art. For example, a user and/or service provider may select a geographical distance or range within which to obtain quotes or send quotes.

In some further exemplary embodiments, the platform may interact with parts suppliers, automatically ordering parts required for a service or repair to the service provider when a user selects the service provider. The parts may therefore be shipped to the service provider without requiring any action by the service provider, which may reduce time spent by the service provider and reduce delays in completing the service.

The ability to view a variety of quotes, view all available appointment times, and book an appointment without conversing with a representative of the service provider makes it possible to view and assess more information in a plausible amount of time. Additionally, service providers may utilize the platform to compare rates with competitors and therefore efficiently establish competitive rates in their marketplace.

Figure 20:
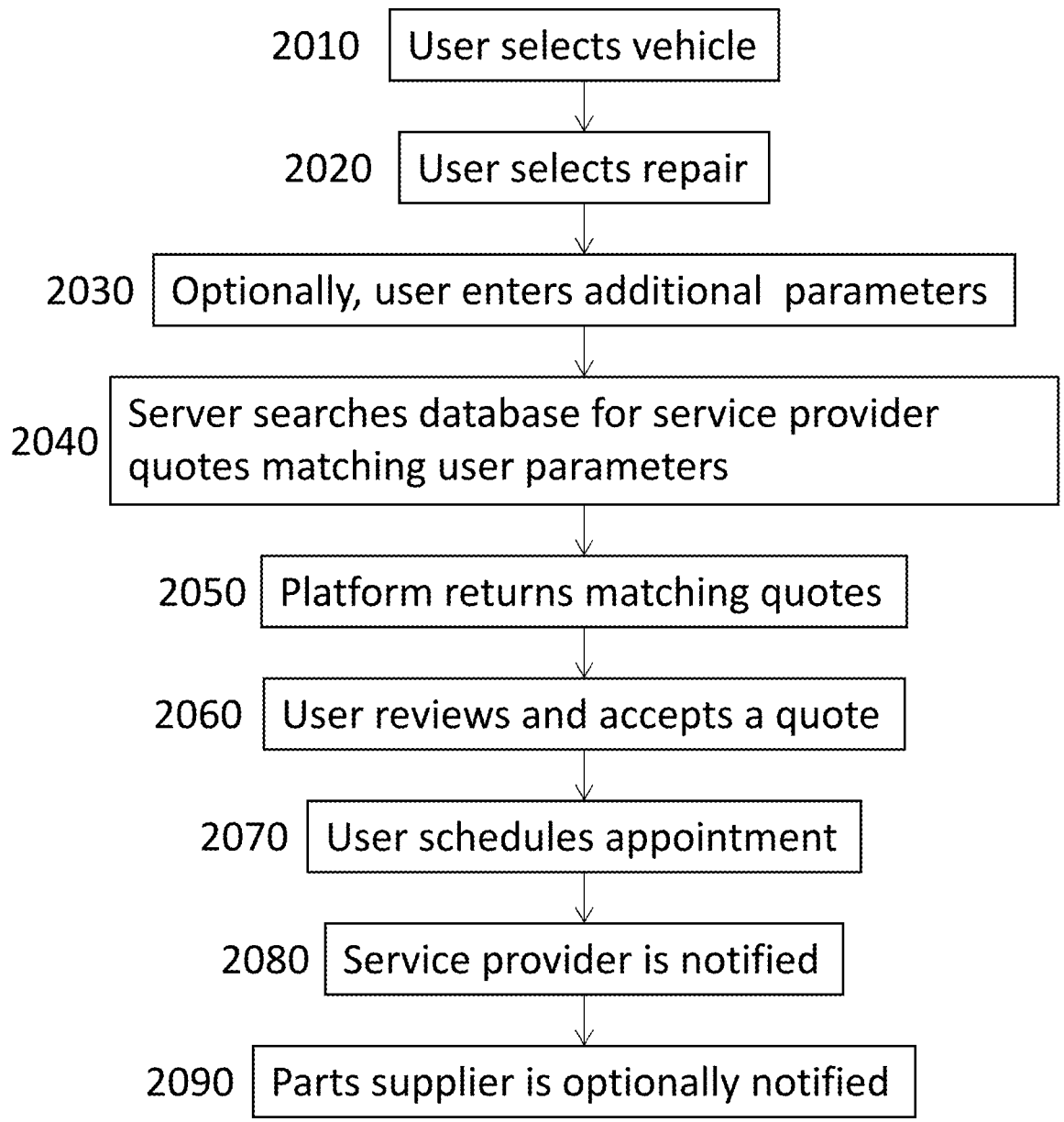
FIG. 20 shows an exemplary flow chart of a quote request and acceptance.

As shown in exemplary FIG. 20, a quote review and acceptance may broadly progress through the platform as follows. Intervening steps and selections may be present in an exemplary embodiment, as discussed through the present description. A user may select a vehicle 2010. The user may then select a repair 2020. A user may optionally enter additional parameters 2030. A platform server may search a database for service provider quotes matching the parameters 2040. Next, the platform may return matching quotes to the user 2050. The user may review and accept a quote 2060. Then, the user may schedule an appointment through the platform 2070. The service provider may be notified of the schedule appointment 2080. A parts supplier may also optionally be notified 2090, which may trigger sending of required parts to the service provider.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for providing auto repair quotes, comprising:
   (a) storing a platform of providers with firm quotes, the platform of providers with firm quotes comprising a plurality of service provider profiles, each of the plurality of service provider profiles being associated with at least one of a plurality of automotive service providers,
each of the plurality of service provider profiles comprising:
service provider geographic information,
at least one service provided by the service provider, wherein each service provided by the service provider corresponds to quote information,
wherein each of the plurality of service provider profiles is configured to be accessed and edited directly through a shop owner section by the associated service provider(s),
(b) displaying, on a user interface, a mode by which a service may be selected to directly generate a repair request form;
(c) receiving a service request from a customer identifying a selected service and further comprising customer geographic information;
(d) maintaining an aggregator database of updated available service provider appointment data that is associated with and individual to each automotive service provider, wherein maintaining the database comprises:
receiving scheduling information for an automotive service provider,
storing in the aggregator database, the received automotive service provider scheduling information and associating the received automotive service provider scheduling information with an automotive service provider,
receiving new automotive service provider scheduling information, and
updating the available service provider appointment data in the aggregator database;
(e) processing the service request for each automotive service provider having the identified service stored in the aggregator database, wherein processing comprises:
generating, from the stored automotive service provider scheduling information, a plurality of individual start times,
determining if there is quote information corresponding to the identified service and the selected automotive service provider, and if so, retrieving said quote information;
(f) dynamically displaying, to the customer, a limited list of data comprising a plurality of services offered by at least one automotive service providers and automatically populating the limited list of data based on a selection of services provided in the automotive service provider profile of each of the plurality of automotive service providers and based on retrieved quote information;
(g) booking a service appointment at a customer-selected automotive service provider at a customer-selected start time for the identified service request, wherein booking comprises:
receiving a customer address for an electronic communication, wherein the customer address is withheld prior to the booking step;
sending an electronic communication providing information on the appointment, and
updating the available service provider appointment data in the aggregator database.

2. The method of claim 1, wherein the quote information is individual to each automotive service provider.

3. The method of claim 1, wherein the quote information is individual to each service provider profile.

4. The method of claim 1, wherein the quote information comprises an indication that further inspection is required.

5. The method of claim 1, wherein each stored service is selected from a set of predefined services.

6. The method of claim 1, wherein at least one of the at least one stored service is associated with a particular make, model, and year of automobile.

7. The method of claim 1, wherein the mode by which a service may be selected to directly generate a repair request form comprises a predefined set of individually selectable services.

8. The method of claim 1, wherein the mode by which a service may be selected to directly generate a repair request form comprises a search engine.

9. The method of claim 1, wherein the service request from a customer further comprises automobile information.

10. The method of claim 1, wherein the new automotive service provider scheduling information indicates a booked appointment.

11. The method of claim 1, wherein the new automotive service provider scheduling information indicates the service provider is unavailable.

* * * * *